(12) United States Patent
Conyers et al.

(10) Patent No.: US 9,228,462 B2
(45) Date of Patent: Jan. 5, 2016

(54) JACKET-COOLED EXHAUST MANIFOLD

(71) Applicant: Caterpillar Inc., Peoria, IL (US)

(72) Inventors: Jeremy Conyers, Simpsonville, SC (US); Matthew Mcconville, Greenville, SC (US); Thomas Withers, Simpsonville, SC (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 14/174,356

(22) Filed: Feb. 6, 2014

(65) Prior Publication Data

US 2015/0218986 A1 Aug. 6, 2015

(51) Int. Cl.
*F01N 3/02* (2006.01)
*F01N 3/04* (2006.01)
*F01N 13/18* (2010.01)

(52) U.S. Cl.
CPC ............... *F01N 3/046* (2013.01); *F01N 13/18* (2013.01)

(58) Field of Classification Search
CPC ................................ F01N 13/18; F01N 3/046
USPC ............................................ 60/321, 323, 324
See application file for complete search history.

(56) References Cited

U.S. PATENT DOCUMENTS

| | | | |
|---|---|---|---|
| 3,169,365 A | 2/1965 | Benjamen | |
| 3,261,337 A | 7/1966 | Muller | |
| 3,921,398 A | 11/1975 | Kashmerick | |
| 4,711,088 A | 12/1987 | Berchem et al. | |
| 5,689,954 A * | 11/1997 | Blocker | F01N 13/10 138/155 |
| 5,820,426 A | 10/1998 | Hale | |
| 6,254,142 B1 * | 7/2001 | Kaifel | F01N 13/10 285/124.1 |
| 6,511,356 B2 | 1/2003 | Yukishima | |
| 7,552,721 B2 | 6/2009 | Wolfsgruber et al. | |
| 2009/0282820 A1 * | 11/2009 | Hill, Jr. | B21D 53/84 60/323 |
| 2011/0308237 A1 | 12/2011 | Nagayama | |
| 2013/0232959 A1 * | 9/2013 | Uchida | F01N 13/10 60/323 |

FOREIGN PATENT DOCUMENTS

JP 08218865 A 8/1996

* cited by examiner

*Primary Examiner* — Jason Shanske

(74) *Attorney, Agent, or Firm* — Baker & Hostetler LLP (57) ABSTRACT

The present disclosure considers an exhaust manifold and method of casting an exhaust manifold, where the exhaust manifold has both a portion of the exterior wall that is jacket cooled and a portion of the exterior wall that is not cooled. The non-cooled portion of the exterior is not accessible when the exhaust manifold is secured to the engine block. Furthermore, the non-cooled portion of the exterior wall of the exhaust manifold is designed to add stability during the casting process and allow for a simplified casting process with fewer cores.

11 Claims, 9 Drawing Sheets

JACKET-COOLED EXHAUST MANIFOLD

TECHNICAL FIELD

This patent disclosure relates generally to an exhaust manifold and a method of casting an exhaust manifold and, more particularly, to a jacket-cooled exhaust manifold and a method of casting a jacket-cooled exhaust manifold.

BACKGROUND

International safety standards often specify maximum surface temperatures in engine environments. One component of the engine environment is the exhaust manifold, which accumulates exhaust gases from multiple engine cylinders into one exhaust pipe. In the marine environment, jacket-cooling is a method used to comply with safety standards specifying maximum surface temperatures. A coolant jacket can shield and cool hot exhaust manifolds coupled with an engine, thus maintaining a surface temperature below the specified maximum. Such jacket cooled exhaust manifolds can be constructed out of fabricated or cast metal.

Prior exhaust manifolds, such as the exhaust manifold disclosed in U.S. Pat. No. 3,921,398 to Kashmerick, have portions constructed out of cast aluminum and include a cooling jacket to reduce the surface temperature of the exhaust manifold. The prior casting methods used to construct such exhaust manifolds required a complex and a resource intensive manufacturing process, often requiring casting of multiple pieces followed by an assembly of cast portions. The present disclosure is directed to mitigating or eliminating one or more of the drawbacks discussed above.

SUMMARY

The present disclosure considers a new exhaust manifold design that is easier to manufacture leading to cost reductions during the manufacturing process. The new exhaust manifold design provides a novel method of transferring exhaust from engine cylinders to the exhaust pipe while meeting industry safety standards concerning the maximum exposed surface temperature for exhaust manifolds. To lower the difficulty and cost of manufacturing the exhaust manifold, the proposed exhaust manifold has both a portion of the exterior wall that is jacket cooled and a portion of the exterior wall that is not cooled. The non-cooled portion of the exterior is not exposed to the operator when the exhaust manifold is secured to the engine block.

The exhaust manifold can contain a plurality of exhaust gas inlets on one lateral side to match with engine cylinder outlets. A longitudinal exhaust passageway merges the exhaust gas from the inlets and leads to an exhaust outlet of the exhaust manifold. The exhaust manifold can also include a coolant passageway between the longitudinal exhaust passageway and the exterior wall. The coolant passageway can be fed by an inlet port, while outlet ports can allow the coolant to exit the exhaust manifold.

The disclosed exhaust manifold includes voids, or air pocket indentations, on the non-coolant cooled side of the exhaust manifold, between the exhaust gas inlets on the lateral side of the exhaust manifold facing the engine cylinders. Because the air pocket indentations are disposed between the exhaust gas inlets they are not exposed while the exhaust manifold is attached to the engine. Therefore the air pocket indentations do not have to comply with the skin surface temperature safety regulations. These air pocket indentations form the non-cooled portion of the exterior wall of the exhaust manifold. The material used to form the air pockets indentations can also provide internal support to the exhaust gas inlets during the casting process. The air pocket indentations can also reduce the number of cores required during the casting process used to manufacture the exhaust manifold. The air pocket indentations can also simplify the shape of cores used in the casting process.

The present disclosure also considers a method of casting an exhaust manifold that provides a low cost and efficient method of transferring exhaust from engine cylinders to the exhaust pipe while meeting industry safety standards concerning the maximum exposed surface temperature for exhaust manifolds.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

FIG. 1-6 illustrate multiple perspective and cross-sectional views of an exemplary exhaust manifold 100. The first lateral side of the exterior wall 120 can have a plurality of air pocket indentation 121-125. The first lateral side of the exterior wall 120 can be the side of the exemplary exhaust manifold 100 that connects with the engine. The air pocket indentations 121-125 can be disposed between the exhaust gas inlets 131-136. In use, the air pocket indentations 121-125 are not exposed while the exhaust manifold 100 is attached to an engine. Because the air pocket indentations 121-125 are not exposed during use, these air pocket indentations 121-125 do not have to comply with the skin surface temperature safety regulations. The air pocket indentations 121-125 can also provide internal support for the formation of the exhaust gas inlets 131-136 during production of the exhaust manifold 100. The exhaust manifold 100 can be produced through sand casting as detailed below when describing exemplary method 200 and FIG. 7. During the sand casting process the air pocket indentations 121-125 can allow a reduced number of cores to be required during the casting process and can further simplify the shape of the cores necessary to create the exhaust manifold 100.

The present disclosure contemplates embodiments of the exemplary exhaust manifold 100 where different amounts of the exhaust gas inlets 131-136 on the first lateral side of the exterior wall 120 of the exemplary exhaust manifold 100 are incorporated in the exemplary exhaust manifold 100. The number of exhaust gas inlets 131-136 can be dependent upon the number of engine cylinders in the engine to which the exemplary exhaust manifold 100 is coupled. As the number of exhaust gas inlets 131-136 is altered the number of air pocket indentations 121-125 can be altered accordingly.

As shown in FIGS. 1, 2, 4, and 5 the exemplary exhaust manifold 100 can have an exhaust outlet 137 at the first distal end of the exterior wall 150. The exhaust outlet 137 can be part of an elbow portion 143 of the exemplary exhaust manifold 100 that bends around an axis on the top side of the exterior wall 127. In other embodiments, the exhaust gas outlet 137 can be located at different locations on the exemplary exhaust manifold 100 to accommodate connections with other engine components, such as a turbocharger. The exemplary exhaust manifold 100 can have a coolant inlet port 141 on the second distal end of the exterior wall 152. The exemplary exhaust manifold 100 can have a first coolant outlet port 142 on the top side of the exterior wall 127. The exemplary exhaust manifold can have a second coolant outlet port 143 on the bottom side of the exterior wall 128.

Figure 3:
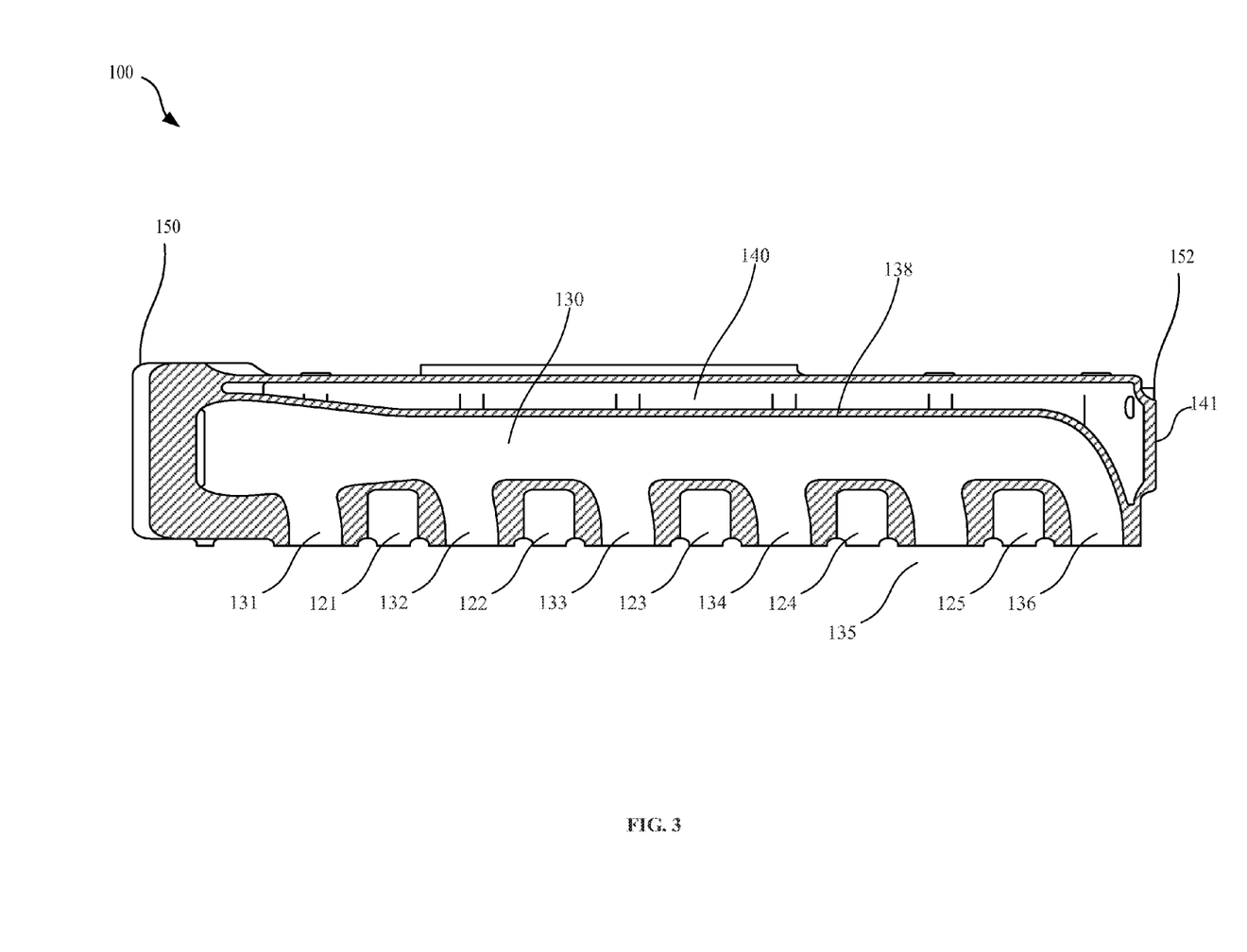
FIG. 3 is a cross-sectional view from the perspective of the bottom side of an example exhaust manifold.
Figure 5:
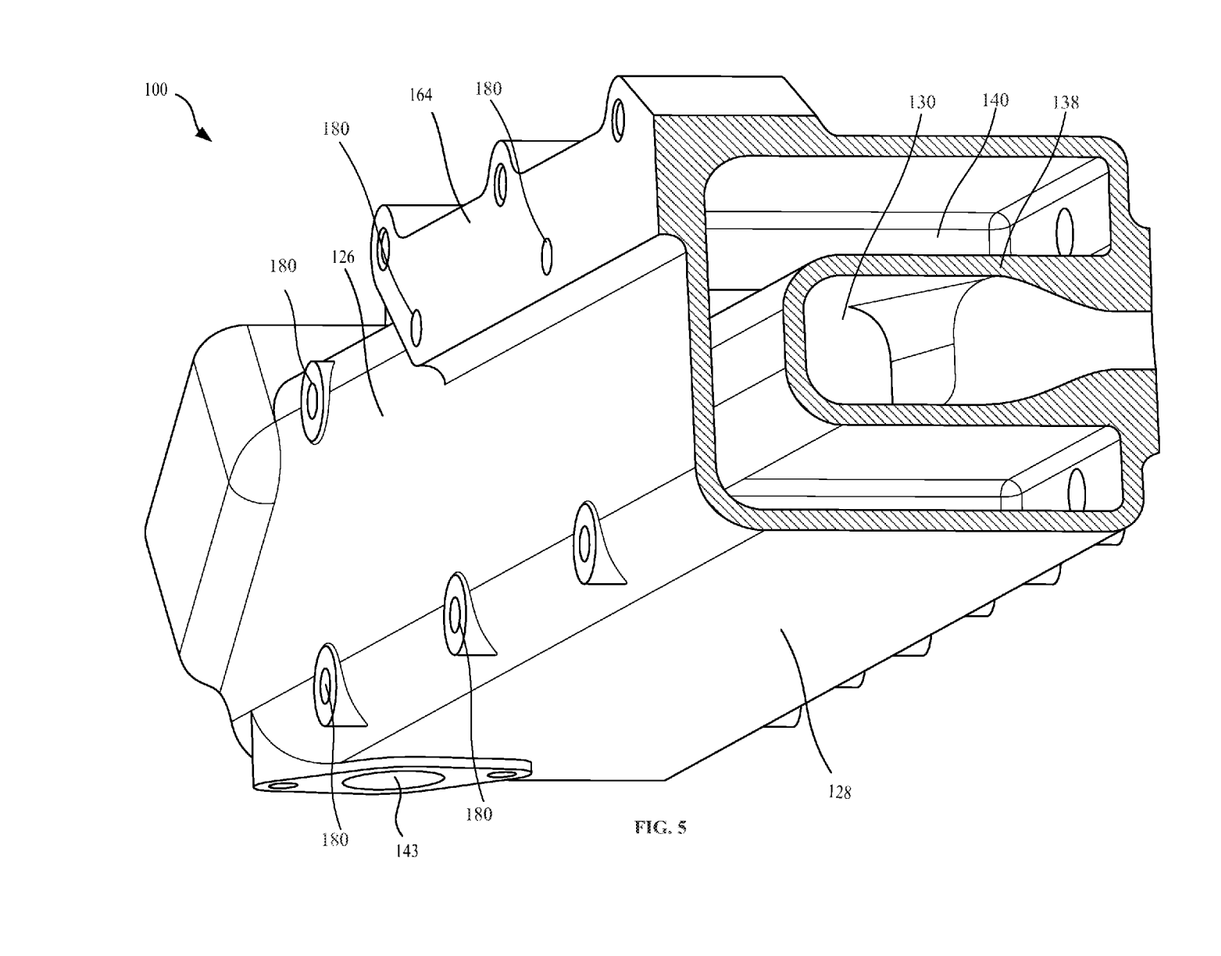
FIG. 5 is a cross-sectional view from the perspective of the second lateral side of an example exhaust manifold.
Figure 6:
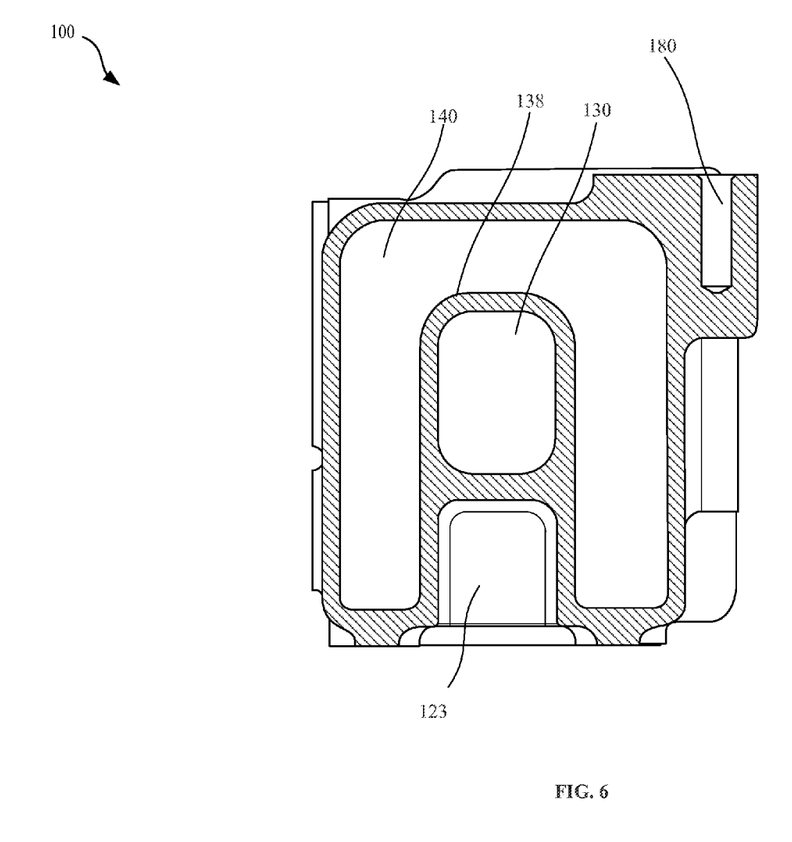
FIG. 6 is a cross-sectional view from the perspective of the first distal end of an example exhaust manifold.

As shown in FIGS. 3, 5, and 6, the interior of the exemplary exhaust manifold 100 can have a longitudinal exhaust gas passageway 130 that runs longitudinally from the second distal end of the exterior wall 152 to the first distal end of the exterior wall 150. The exemplary manifold 100 can have a longitudinal coolant passageway 140 that runs longitudinally from the second distal end of the exterior wall 152 to the first distal end of the exterior wall 150. The longitudinal exhaust gas passageway 130 and the longitudinal coolant passageway 140 can be separated by a longitudinal interior wall 138.

Figure 1:
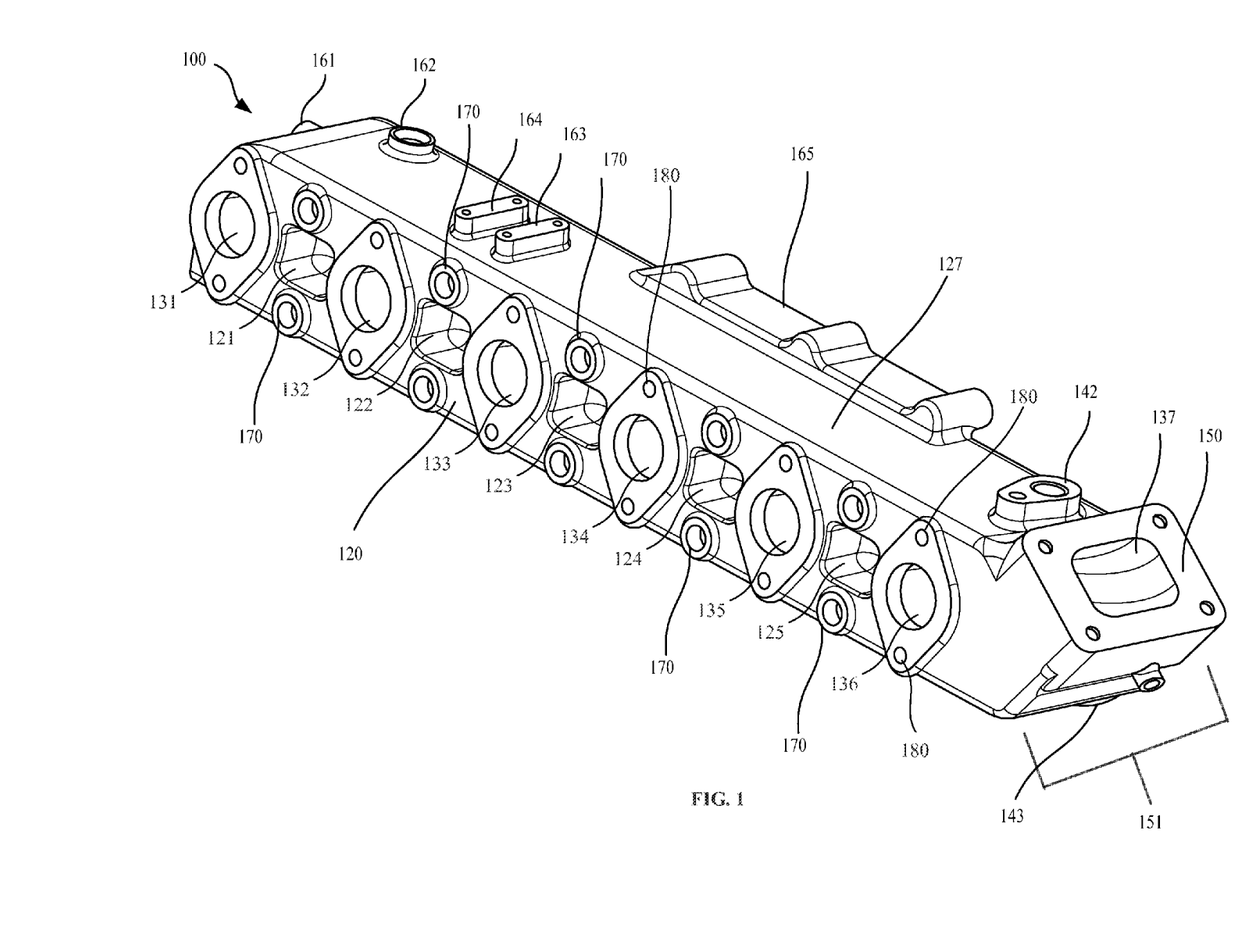
FIG. 1 is a perspective view of the first lateral side of an example exhaust manifold.
Figure 2:
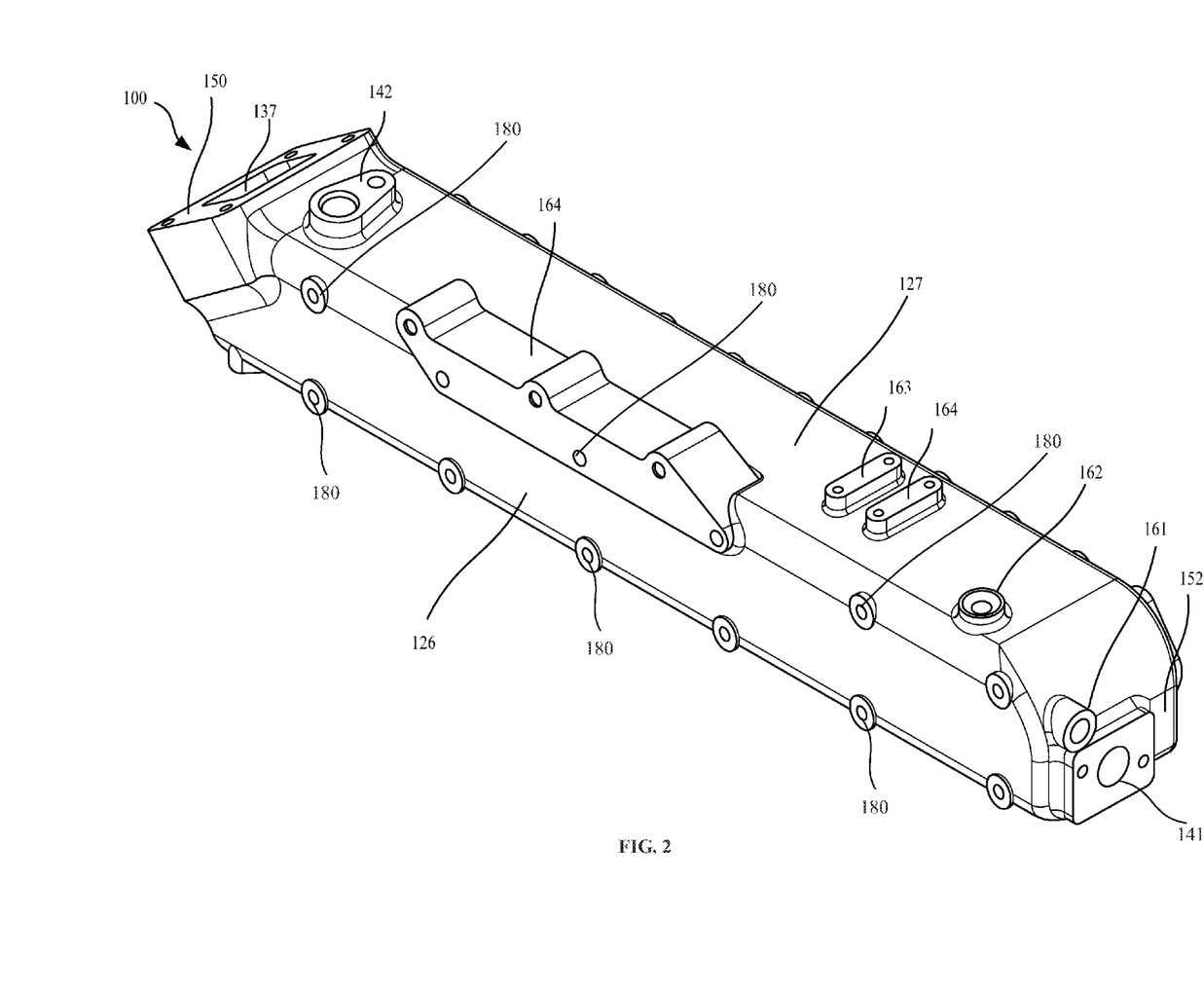
FIG. 2 is a perspective view of the second lateral side of an example exhaust manifold.

The exemplary exhaust manifold 100 can have multiple sensor ports on the exterior walls of the exemplary exhaust manifold 100. As shown in FIGS. 1 and 2 a temperature sensor port 162 can allow for the temperature of the coolant used for cooling within the exemplary exhaust manifold 100 to be measured. The temperature port 162 is shown in FIG. 1 on the top side of the exterior wall 127 of the exemplary exhaust manifold 100, but can be located anywhere on the exterior wall of the exemplary exhaust manifold 100. In other embodiments of the disclosed invention, multiple temperature ports 162 can be used to measure the exemplary exhaust manifold's exterior wall skin temperature, the temperature of the coolant, or the temperature of the exhaust gas. Sensors used in the temperature ports 161 can be in communication with a switch located on the exemplary exhaust manifold 100. The switch can be secured to the exemplary exhaust manifold 100 using a first switch attachment mechanism 163 and possibly a second attachment mechanism 164. There can be multiple switches in communication with multiple temperature sensors during the operations of the exhaust manifold. If the temperature of the exemplary exhaust manifold's exterior wall skin, the exhaust gas, or the coolant rises above or falls below threshold values the switch may alter the operation of the exhaust manifold or shut down the engine system including the exhaust manifold.

Figure 4:
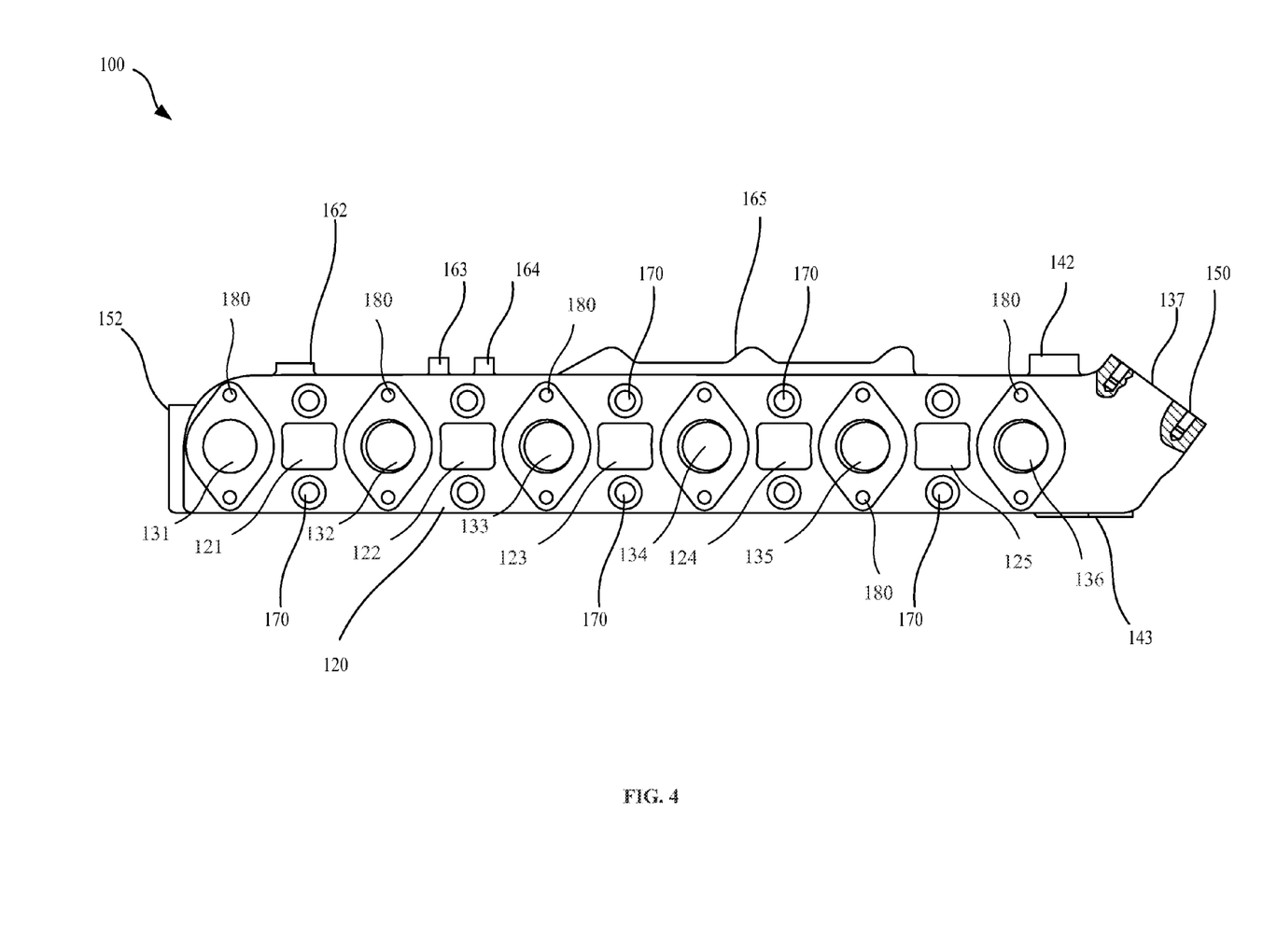
FIG. 4 is a front side view of view of the first lateral side of an example exhaust manifold

As shown in FIGS. 1, 2, and 4 a pressure port 161 can allow for the pressure of the coolant within the exemplary exhaust manifold 100 to be measured. The pressure port 161 is shown in FIG. 1 on the second distal end of the exterior wall 152 of the exemplary exhaust manifold 100, but can be located anywhere on the exterior wall of the exemplary exhaust manifold 100. In other embodiments of the disclosed invention, multiple pressure ports 161 can be used to measure the pressure of the coolant or the pressure of the exhaust gas. Sensors used in the pressure ports 161 can be in communication with a switch located on the exemplary exhaust manifold 100 and secured by a first switch attachment mechanism 163 and possibly a second attachment mechanism 164. There can be multiple switches in communication with multiple pressure sensors during the operations of the exhaust manifold. If the pressure of the exhaust gas or coolant rises above or falls below threshold values the switch may alter the operation of the exhaust manifold or shut down the engine system including the exhaust manifold.

As shown in FIGS. 1, 2, 4, and 5 a mounting attachment mechanism 165 can be located on the top side of the exterior wall 127 of the exemplary exhaust manifold 100. The mounting attachment mechanism 165 can be used to secure the exemplary exhaust manifold 100 to other parts of an engine system. The present disclosure contemplates multiple mounting attachment mechanisms 165 for securing the exemplary exhaust manifold 100 to multiple parts of an engine system.

As shown in FIGS. 1, 2, 4, and 5 bolt holes 180 can be located on the first lateral side of the exterior wall 120 of the exemplary exhaust manifold 100. The bolt holes 180 can traverse the body of the exemplary exhaust manifold 100 extending from the second lateral side of the exterior wall 126 to the first lateral side of the exterior wall 120. The bolt holes 180 can be utilized to secure the exemplary exhaust manifold 100 to the engine head. The present disclosure contemplates bolt holes 180 located at various intervals and locations within the exemplary exhaust manifold 100 and exiting the exemplary exhaust manifold 100 at various intervals and locations on the first lateral side of the exterior wall 120.

As shown in FIGS. 1 and 4 the exemplary exhaust manifold 100 can have sand core plug ports 170. The sand core plug ports 170 can be used to extract the sand cores used during the casting process. The sand core plug ports 170 can be located on the first lateral side of the exterior wall 120 or at different locations on the exterior wall of the exemplary exhaust manifold 100. The location of the sand core plug ports 170 can be altered to simplify the casting process as needed.

During operation, the exemplary exhaust manifold 100 can transfer exhaust gas from an engine to a turbocharger or to another engine system component. The engine, to which the exemplary exhaust manifold 100 can be coupled, can be an engine for many types of machines, such as machines in a marine environment, mining machines, or excavation machines. The exhaust gas inlets 131-136 can take in exhaust gas from corresponding engine cylinder outlets. The exhaust gas enters the exhaust manifold through the exhaust gas inlets 131-136. Next the exhaust gas merges from the exhaust gas inlets 131-136 into the longitudinal exhaust gas passageway 130. The exhaust gas can travel down the longitudinal exhaust gas passageway 130 and out the exhaust gas outlet 137. After the exhaust gas exits through the exhaust gas outlet 137 it can enter a turbocharger where the exhaust gas is used to drive a turbine. Thus, the exhaust manifold 100 can transfer and direct the exhaust gas from an engine to a turbocharger.

During operation, the exhaust manifold 100 can be cooled by engine coolant, such as water or glycol mixture. The coolant can enter the exemplary exhaust manifold 100 through the coolant inlet port 141. The coolant can be pumped into the exemplary exhaust manifold 100 through the coolant inlet port 141. The coolant temperature and pressure can be monitored through a temperature sensor port 161 and a pressure sensor port 162. After the coolant passes through the coolant inlet port 141 it can travel through the longitudinal coolant passageway 140 formed by portions of the exterior wall and the longitudinal interior wall 138. The coolant can exit the exemplary exhaust manifold 100 through either a first coolant outlet port 142, which can be located on the top side of the exterior wall 127, or through the second coolant outlet, which can be located on the bottom side of the exterior wall 128. In some embodiments the coolant that exits through the first coolant outlet port 142 can travel to the turbocharger, which can be driven by the exhaust gas that exits the exemplary exhaust manifold 100 at the exhaust gas outlet 137, where the coolant can again cool the skin temperature of the turbocharger. In some embodiments the coolant that exits through the second coolant outlet port 143 can be circulated through a general engine cooling system. The present disclosure contemplates multiple embodiments with various coolant outlet ports delivering coolant to various engine components.

Figure 7:
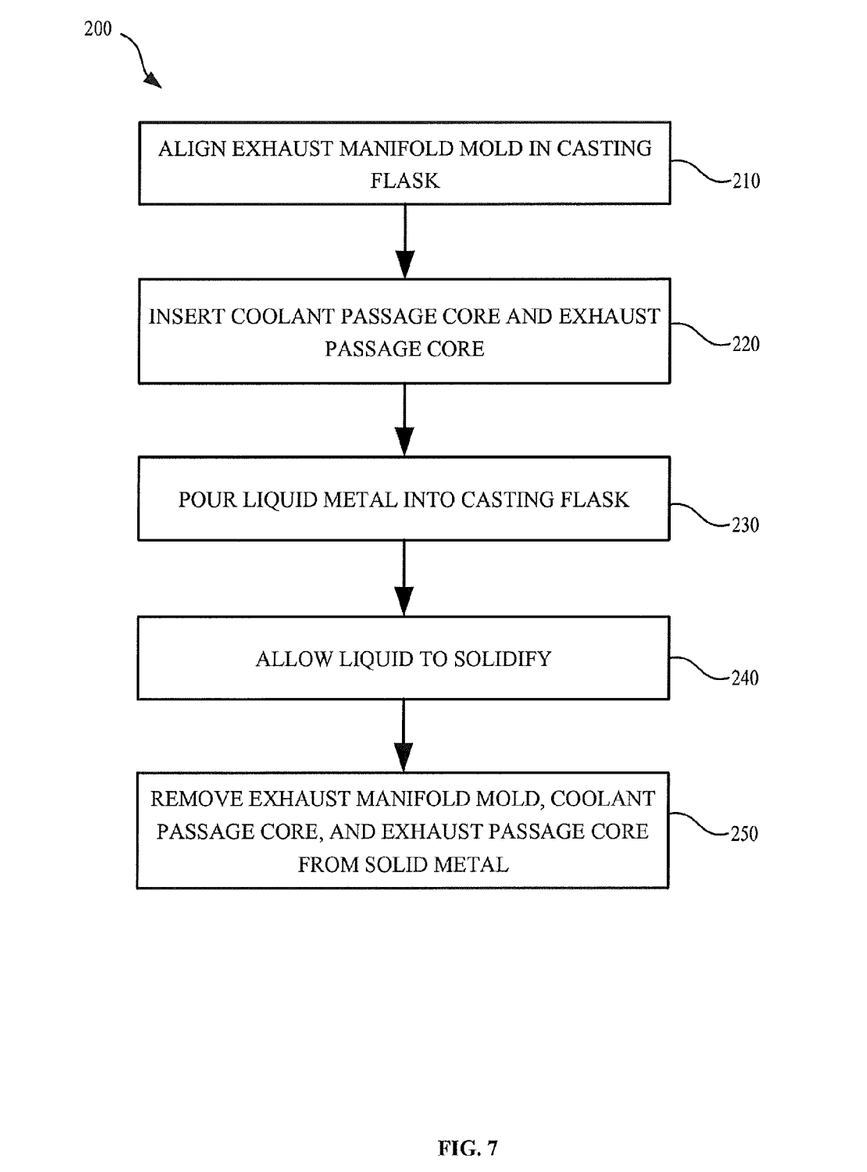
FIG. 7 is a flowchart showing the steps of an exemplary method.

As shown in the flowchart in FIG. 7 the present disclosure contemplates an exemplary method of casting an exhaust manifold 200. The method can produce the exemplary exhaust manifold 100 disclosed above. The exemplary method of casting 200 can involve aligning an exhaust manifold mold in a casting flask. The exhaust manifold mold can be made of metal or the exhaust manifold mold can also be made of sand and can be formed by inserting an exhaust manifold pattern into the casting flask to render an imprint of the exterior of the manifold pattern. The exhaust manifold mold, whether made of metal or sand, can include a plurality of air pocket indentations located on the first lateral side of the exterior wall of the exhaust manifold mold. The air pocket indentations in the mold render the air pocket indentations 121-125 disclosed in the exemplary exhaust manifold 100 above.

The exemplary method of casting 200 can involve inserting a coolant passage core 231 and an exhaust passage core within the exhaust manifold mold. The casting flask can be two parts with a top part, known as a cope, and bottom part, known as a drag. The exhaust manifold mold can also come in two parts with a bottom part that rests in the drag of the casting flask and top part that rests in the cope of the casting flask. The coolant passage core 231 and the exhaust passage core can be laid within the bottom part of the exhaust manifold mold and then enclosed by sealing the casting flask by laying the top part of the exhaust manifold mold in the cope of the casting flask over the bottom part of the exhaust manifold mold in the drag of the casting flask.

In the exemplary method of casting 200 the exhaust passage core can be inserted into the exhaust manifold mold prior to inserting the coolant passage core 231 into the exhaust manifold mold. The exhaust passage core can have a generally cylindrical shape and include a plurality of protrusions. The exhaust passage core can be inserted within the mold such that the plurality air pocket extensions of the mold are disposed between the plurality of protrusions of the exhaust passage core.

Figure 8:
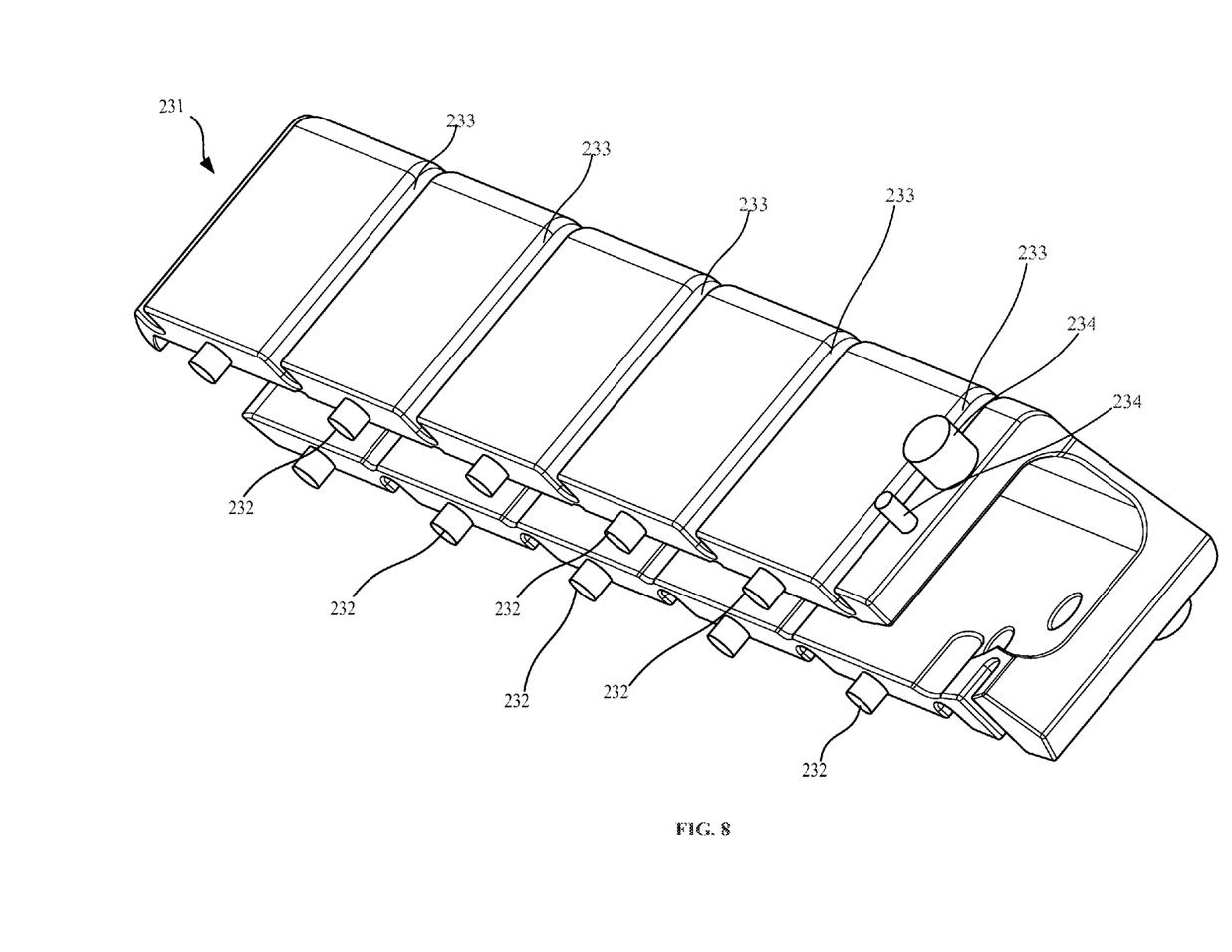
FIG. 8 is a perspective view an example casting core used in the method for casting an exhaust manifold.
Figure 9:
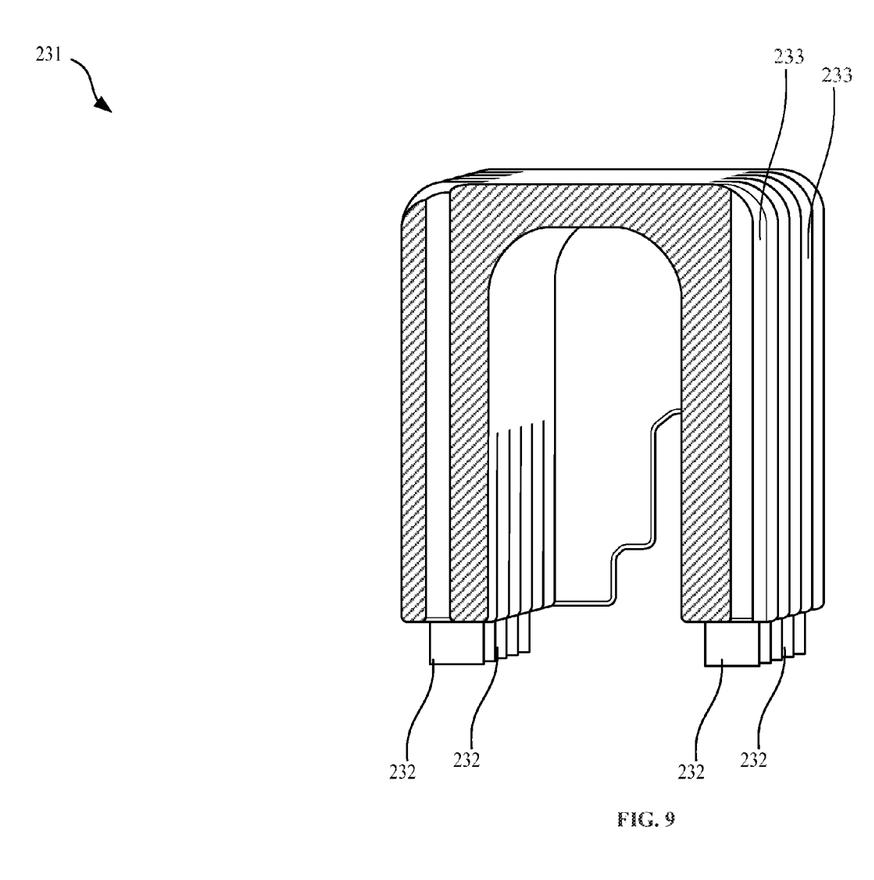
FIG. 9 is cross-sectional view from the perspective of the first distal end of an example casting core used in the method for casting an exhaust manifold.

As shown in FIGS. 8 and 9, the coolant passage core 231 can be generally U-shaped and extend longitudinally. The coolant passage core 231 can be inserted into the mold such that the plurality air pocket extensions of the exhaust manifold mold and the exhaust passage core are surrounded by the coolant passage core 231. The coolant passage core can have a plurality of sand core plugs 232 extending from the generally U-shaped frame. The sand core plugs 232 can correspond with the sand core plug ports 170 on the exemplary exhaust manifold 100. The coolant passage core 231 can include first coolant outlet core plugs 234 that correspond with the first coolant outlet port 142 of the exemplary exhaust manifold 100. The present disclosure contemplates multiple embodiments of the coolant passage core 231 with multiple core plugs corresponding to multiple coolant outlets ports, coolant inlets ports, exhaust gas outlets, exhaust gas inlets, sensor ports, and other ports that could be required on the exemplary exhaust manifold 100. The coolant passage core 231 can include bolt grooves 233 that correspond to the bolt holes 180 in the exemplary exhaust manifold 100.

The exemplary method of casting 200 can involve pouring a liquid metal into the sealed casting flask. The liquid metal can be an aluminum alloy or another metallic alloy, such as cast or ductile iron. The aluminum alloy can have varying percentages of aluminum, silicon, iron, copper, manganese, magnesium, zinc, titanium, lead, or other elements. The exemplary method of casting 200 can involve allowing the liquid metal to solidify into a solid metal piece. The exemplary method of casting 200 can involve removing the exhaust manifold mold and the cores from casted exhaust manifold. As disclosed above the cores can be extracted through the sand core plug ports 170 in the exemplary exhaust manifold 100.

INDUSTRIAL APPLICABILITY

The present disclosure is applicable to engine systems that require an exhaust manifold that is coolant cooled. Often these engine systems are found in marine environments. The disclosed exemplary exhaust manifold 100 can be used to direct exhaust gas from engine cylinders to a turbocharger where the exhaust gas is used to generate additional power. The exemplary exhaust manifold 100 can also direct the cooling coolant that is pumped into the exemplary exhaust manifold 100 to other components of the engine system The disclosed exemplary method of casting an exhaust manifold 200 is applicable to the manufacturing process required to create the exemplary exhaust manifold 100. The disclosed exemplary method of casting an exhaust manifold 200 uses only two cores during the casting process, which can be less complex and more cost effective for manufacturing. Using only two cores, rather than three or more cores as in prior methods for casting exhaust manifolds, there is at least one less sand core that needs to be produced and secured during the pouring of the casting. In past methods two cooling cores had to be joined to form a cooling jacket. Using two separate cooling cores to create a single cooling jacket, can result in a seam which could result in leakage from the cooling jacket into other portions of the exhaust manifold. The location of the air pocket indentations 121-125 in the exhaust manifold mold will also serve to avoid a large solid section of metal on the first lateral side of the exterior wall 120 of the exemplary exhaust manifold 100. During the casting process a large solid section of metal in the mold can create a high risk of porosity in the casting due to variance in the solidifying cooling times between the metal towards the interior of the exemplary exhaust manifold 100 and metal on the towards the exterior surfaces of the exemplary exhaust manifold 100.

The present disclosure includes other aspects, objects, and advantages of the present invention can be obtained from a study of the drawings, the disclosure, and the claims. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An exhaust manifold comprising:
   a plurality of exhaust gas inlets located on a first lateral side of an exterior wall of the exhaust manifold;
   a longitudinal exhaust gas passageway formed by a longitudinal interior wall, wherein the plurality of exhaust gas inlets allow exhaust gas to flow into and merge in the longitudinal exhaust passageway;
   an exhaust gas outlet, wherein the exhaust gas outlet allows the exhaust gas from the longitudinal exhaust gas passageway to exit the exhaust manifold;
   a longitudinal coolant passageway located between the longitudinal interior wall and second lateral side, a top side, and a bottom side of the exterior wall of the exhaust manifold; and
   a plurality of air pocket indentations located on the first lateral side of the exterior wall of the exhaust manifold, wherein the air pockets indentations are formed by depressions in the first lateral side of the exterior wall of the exhaust manifold.

2. The exhaust manifold of claim 1, wherein a coolant inlet port at the second distal end of the exterior wall allows coolant to flow into the longitudinal coolant passageway.

3. The exhaust manifold of claim 2, wherein a first coolant outlet port on the top side of the exterior wall allows coolant to exit from the longitudinal coolant passageway.

4. The exhaust manifold of claim 3, wherein a second coolant outlet port on the bottom side of the exterior wall allows coolant to exit from the longitudinal coolant passageway.

5. The exhaust manifold of claim 4, wherein the exhaust gas outlet is located at a first distal end of the exhaust manifold.

6. The exhaust manifold of claim 5, wherein plurality of exhaust gas inlets receive exhaust gas from a plurality of engine cylinder outlets.

7. The exhaust manifold of claim 6, further comprising a temperature sensor port.

8. The exhaust manifold of claim 7, further comprising a pressure sensor port.

9. The exhaust manifold of claim 8, further comprising a switch attachment mechanism.

10. The exhaust manifold of claim 9, wherein the exhaust manifold is in a marine environment.

11. The exhaust manifold of claim 10, wherein the exhaust manifold is made of an aluminum alloy.

* * * * *